US007897079B2

(12) United States Patent
Miller

(10) Patent No.: US 7,897,079 B2

(45) Date of Patent: Mar. 1, 2011

(54) METHOD AND APPARATUS FOR SCRIM EMBEDMENT INTO WET PROCESSED PANELS

(75) Inventor: David Paul Miller, Lindenhurst, IL (US)

(73) Assignee: United States Gypsum Company, Chicago, IL (US)

(*) Notice: Subject to any disclaimer, the term of this patent is extended or adjusted under 35 U.S.C. 154(b) by 684 days.

(21) Appl. No.: 11/533,886

(22) Filed: Sep. 21, 2006

(65) Prior Publication Data

US 2008/0073808 A1 Mar. 27, 2008

(51) Int. Cl.
*B32B 13/02* (2006.01)

(52) U.S. Cl. ...................... 264/172.19; 156/42; 162/216; 162/336; 264/333

(58) Field of Classification Search .................... 264/86, 264/333, 87, 39, 172.19–173.1; 156/39–42, 156/346–348; 162/103, 104, 108, 296, 216, 162/336, 337, 349, 350

See application file for complete search history.

(56) References Cited

U.S. PATENT DOCUMENTS

| | | | |
|---|---|---|---|
| 2,200,155 | A | 5/1940 | Camp et al. |
| 4,364,790 | A | 12/1982 | Delcoigne et al. |
| 4,378,405 | A | 3/1983 | Pilgrim |
| 4,383,960 | A | 5/1983 | Delcoigne et al. |
| 4,450,022 | A | 5/1984 | Galer |
| 4,572,861 | A | 2/1986 | Barretto Garcia et al. |
| 4,646,498 | A | 3/1987 | Schneller et al. |
| 5,135,805 | A | 8/1992 | Sellers et al. |
| 5,221,386 | A | 6/1993 | Ensminger et al. |
| 5,320,677 | A | 6/1994 | Baig |
| 5,342,566 | A | 8/1994 | Schafer et al. |
| 5,350,554 | A | 9/1994 | Miller |
| 5,477,652 | A | 12/1995 | Torrey et al. |

(Continued)

FOREIGN PATENT DOCUMENTS

| | | |
|---|---|---|
| EP | 0003705 | 8/1979 |

(Continued)

OTHER PUBLICATIONS

Miller, D. Paul and M.R. Lynn. 1998. Development and Scale-Up of USG's Gypsum Fiberboard Technology. In: Proceedings of the 6th International Inorganic-Bonded Wood & Fiber Composite Materials Conference, Sun Valley, Idaho. vol. 6. A.A. Moslemi editor. pp. 4-12.

(Continued)

*Primary Examiner* — Jason L Lazorcik
*Assistant Examiner* — Yana Belyaev
(74) *Attorney, Agent, or Firm* — Novak Druce + Quigg LLP; Philip T. Petti; David F. Janci

(57) ABSTRACT

A method of producing a paperless gypsum/fiber board from a mixture including reinforcing material particles, calcined gypsum and water. A headbox feeds the mixture into a panel forming area (forming pond) over the upper surface of a continuous forming fabric to form a panel mat. Also, a reinforcing mesh is fed over a transverse member, located over a portion of the forming fabric, and into the forming pond to embed the mesh in the mixture. At least a portion of a downstream end of the transverse member is under a downstream portion of the headbox or downstream of the headbox. Then the panel mat is pressed, the calcined gypsum of the pressed panel mat is rehydrated, and the resulting board is dried.

24 Claims, 5 Drawing Sheets

U.S. PATENT DOCUMENTS

| | | | | |
|---|---|---|---|---|
| 5,520,779 | A * | 5/1996 | Bold | 162/181.3 |
| 5,632,848 | A * | 5/1997 | Richards et al. | 156/346 |
| 6,197,235 | B1 | 3/2001 | Miller et al. | |
| 6,488,792 | B2 | 12/2002 | Mathieu | |
| 6,508,895 | B2 | 1/2003 | Lynn et al. | |
| 6,605,186 | B2 | 8/2003 | Miller | |
| 6,699,364 | B2 * | 3/2004 | Song et al. | 162/205 |
| 2001/0012555 | A1 | 8/2001 | Miller et al. | |
| 2002/0069950 | A1 | 6/2002 | Lynn et al. | |

FOREIGN PATENT DOCUMENTS

| | | | |
|---|---|---|---|
| EP | 0 095 943 | A2 | 12/1983 |
| EP | 0154094 | | 9/1985 |
| EP | 0 985 504 | A1 | 3/2000 |
| FR | 2457754 | | 12/1980 |
| FR | 2547533 | | 12/1984 |
| GB | 771581 | | 4/1957 |
| GB | 772581 | | 4/1957 |
| GB | 1536663 | | 12/1978 |
| GB | 2316693 | | 4/1998 |
| JP | 3120013 | | 5/1991 |

OTHER PUBLICATIONS

Miller, D. Paul. 2000. Commercial Scale-Up Experience with USG's Gypsum Fiberboard Process. In: Proceeding of 7th International Inorganic-Bonded Wood & Fiber Composite Materials Conference. Sun Valley, Idaho. vol. 7. A.A. Moslemi editor pp. 337-355.

Louisiana Pacific "FiberBond VHI Specifications" 1994 Two pages.

Inorganic-Bonded Wood and Fiber Composite Materials, vol. 4, D.P. Miller et al., USG Process for Manufacturing Gypsum Fiber Composite Panels, pp. 47-51 (published by the Forest Products Society)(1995).

* cited by examiner

METHOD AND APPARATUS FOR SCRIM EMBEDMENT INTO WET PROCESSED PANELS

FIELD OF THE INVENTION

The present invention relates generally to a method and device for making a paperless gypsum/fiber board with improved impact resistance. More particularly, the present invention relates to a method and device for making a gypsum/fiber board having a reinforcing mesh embedded in the board.

BACKGROUND OF THE INVENTION

Conventional gypsum wallboard or panel is typically manufactured from a plaster slurry wherein a wet slurry of calcium sulfate hemihydrate, generally referred to as calcined gypsum, is placed between two layers of paper and the slurry is allowed to set. The set gypsum is a hard and rigid product obtained when the calcined gypsum reacts with water to form calcium sulfate dihydrate. Gypsum is calcium sulfate in the stable dihydrate state, $CaSO_4.2H_2O$, and includes the naturally occurring mineral, the synthetically derived mineral, and the dihydrate material formed by the hydration of calcined gypsum. Calcined gypsum is either calcium sulfate hemihydrate ($CaSO_4.½H_2O$) or calcium sulfate anhydrite ($CaSO_4$). When calcium sulfate dihydrate is heated sufficiently, in a process called calcining, the water of hydration is driven off and there can be formed either calcium sulfate hemihydrate or calcium sulfate anhydrite, depending on the temperature and duration of exposure. When the dihydrate is heated sufficiently in a saturated steam environment, the dihydrate dissolves and the hemihydrate form precipitates out of solution as well formed crystals. When water is added to the calcined gypsum to cause the gypsum to set, in essence, the calcined gypsum reacts with water, and the gypsum is reformed.

Paper covered wallboard is a popular building material. However, for certain building applications it would be advantageous to provide a gypsum panel that did not rely on paper surface sheets for strength and other properties. Several prior art fiber-reinforced gypsum panels are as follows:

U.S. Pat. No. 5,320,677 to Baig, which is incorporated by reference herein in its entirety, describes a composite product and a process for producing the product in which a dilute slurry of gypsum particles and cellulosic fibers is heated under pressure to convert the gypsum to calcium sulfate alpha hemihydrate. The cellulosic fibers have pores or voids on the surface and the alpha hemihydrate crystals form within, on and around the voids and pores of the cellulosic fibers. The heated slurry is then dewatered to form a mat, preferably using equipment similar to paper making equipment, and before the slurry cools enough to rehydrate the hemihydrate to gypsum, the mat is pressed into a board of the desired configuration. The pressed mat is cooled and the hemihydrate rehydrates to gypsum to form a dimensionally stable, strong and useful building board.

U.S. Pat. No. 6,197,235 to Miller et al., which is incorporated herein by reference in its entirety, discloses a method for texturing gypsum fiber panels and producing surface textured panels, edge tapers, and deeper patterned wainscot-type panels, involving the use of a flexible die with a textured surface. The die is pressed onto the panel in its slurry state just after the onset of an exothermic rehydration reaction. Partial hydration and setting occur during pressing by the die to form a textured mat. The mat is removed from contact with the die at a point along the rehydration temperature curve about at or less than one-half of the rise to the greatest rehydration temperature.

U.S. Pat. No. 6,605,186 to Miller, which is incorporated herein by reference in its entirety, discloses a headbox for use in a water felting process for gypsum/fiber board production including a housing and two rotating horizontal distribution rolls. The housing has curved sections shaped to respectively conform to the outer cylindrical surface of the distribution rolls. Each curved section is respectively closely spaced to a portion of the outer cylindrical surface of both distribution rolls.

Scrim embedment in panel products has been used to improve physical properties. U.S. Pat. No. 6,508,895 to Lynn et al., incorporated herein by reference in its entirety, discloses a gypsum/fiber board having improved impact resistance produced by mixing predetermined amounts of fibers, calcined gypsum and water to form a mixture; and embedding a reinforcing mesh in a layer of the mixture over the upper surface of a forming belt; and forming a board composed of bonded fibers and gypsum with the mesh embedded in the surface of the board.

Previous attempts have used scrim embedment downstream of a headbox a headbox. Scrim fed downstream of the headbox limits control of embedding, caused buildup problems on scrim embedment equipment and adversely affected formation properties in the forming pond. In this process, the scrim is fed above the headbox, down into the pond and then under a rod which assists in placing the scrim at a desired depth.

SUMMARY OF THE INVENTION

It is an object of the present invention to provide a method and device for making a mesh and fiber-reinforced paperless gypsum board.

It is another object of present invention to provide a paperless gypsum/fiber board having a mesh embedded in the backside to provide improved impact resistance as determined by Soft Body Impact Resistance according to ASTM E695 and by Hard Body Impact Resistance according to USG method as documented in independent reports HPWLI #7122 and HPWLI #7811-02. Copies of information in these third party independent testing reports may be requested through USG Corporation, Chicago Ill.

The term "paperless" gypsum/fiber board, as used herein, is intended to distinguish the fiber-reinforced gypsum panels to which the present invention relates from conventional prior art gypsum panels, which are referred to as "wall board" or "dry wall" which have at least one surface comprised of paper, including "wall board" or "dry wall" having some form of fiber-reinforcement in the core.

The present invention provides a method of producing a paperless gypsum/fiber board including forming a mixture (typically a slurry) comprising predetermined amounts of host particles of a reinforcing material, calcined gypsum (calcium sulfate alpha hemihydrate crystals) and water and mesh. (Alternatively, if desired this method could be performed with beta calcium sulfate or blends of alpha calcium sulfate and beta calcium sulfate.) The mixture and a reinforcing mesh are fed into a panel forming area over the upper surface of a porous forming fabric or "wire" similar to that used in fourdrinier wet felting to form a panel mat. In particular, the mesh is fed under the headbox and into the forming pond as the calcined slurry mixture passes from the headbox into the forming pond. Forming fabric is typically an endless belt woven of plastics or metal. Typical plastics include polyester, or nylon, etc. Typical metals include metallic material such as brass, bronze or steel. Forming wire is a subset of forming fabric and is typically made of metallic material.

However, while traveling to the forming pond, the mesh passes over a transverse member, which extends transverse (perpendicular) to the direction of travel of the mesh, and is located over a portion of the forming fabric. A downstream portion of the transverse member is under a downstream portion of the headbox or downstream of the headbox. The reinforcing mesh passes over the transverse member and into the forming pond to embed the reinforcing mesh in the slurry mixture in the forming pond. Afterwards, water is removed from the slurry mixture to form a panel mat with the mesh embedded in the panel mat. When the panel mat having the embedded mesh is pressed, the calcined gypsum of the pressed panel mat rehydrates to form a board comprising bonded host particles and gypsum with the mesh embedded in the board; and the board is dried to provide a finished board with the mesh embedded in the finished board.

The transverse member may be an elevating rod or an infeeding sheet. If desired, the sheet may have at its downstream end an elongate member which has a longitudinal axis transverse (perpendicular) to the direction of travel of the mesh. The infeeding sheet is attached to the elongate member and extends upstream of the elongate member underneath the headbox.

Typically the sheet has a transverse bend starting from a location upstream of the downstream end of the sheet or upstream of the headbox such that a smooth bend of the sheet terminates at the transverse rod and at the elevation of the top of the transverse rod, allowing the scrim (mesh) to maintain continuous contact with the sheet surface and provide a desired self-cleaning effect. The sheet transverse bend typically forms an upwards bend towards its downstream end. The angle of the upwards bend is somewhat dependent on the elevation of the headbox above the forming wire, the tension on the fiberglass scrim web, and the line speed. Typically, the transverse bend starts 6 to 18 inches from the downstream end of the sheet and has a slope forming an angle of at most about 20 degrees with a horizontal axis. At the other end, or infeed end of the sheet, the sheet smoothly bends up from the elevation of the infeeding forming wire (forming fabric) to allow smooth transfer of the scrim to the sheet without snagging either the scrim or the forming wire.

Thus, the mesh, e.g., scrim, is fed under a headbox and over a transverse member held at an elevation underneath a downstream portion of the headbox or downstream of the headbox. This embeds the mesh to minimize disruption of formation. The tension on the mesh then allows the mesh to be embedded at a controlled depth in the forming pond downstream of the transverse member. With little tension, vacuum force moves the mesh to the bottom of the forming pond and the bottom of the resulting board. The slurry and mesh are fed onto a continuously moving dewatering fabric (wire) and the force of the vacuum pulling water through the dewatering forming fabric maintains the vertical force on the mat and scrim on the forming fabric which is in turn pulled in the horizontal direction down the forming line Typically, the sheet has an inverted S-curve. The lowest elevation of the inverted S-curve is typically where the bottom of the sheet contacts the forming wire under the headbox. The highest elevation of the inverted S-curve is typically at the infeed of the scrim upstream of the headbox. The downstream end of the inverted S-curve has an intermediate elevation.

Preferably, the transverse member extends across the width of the forming wire in the forming area. The elongate member and sheet serve to space the mesh about 0.125 to 0.5 inches above the forming wire surface after the mesh passes under a headbox or slurry delivery device. The spacing of the mesh above the forming wire allows a portion of the fiber/gypsum mixture to be between the mesh and forming wire, and embed the mesh, in the finished board.

With more tension, the mesh is embedded further away from the bottom of the panel. The bend in the sheet metal causes the device to be self-cleaning.

If desired, the elongate member (such as a rod) may be employed without the sheet. However, the addition of the sheet improves performance.

The resulting panel mat with the mesh embedded in the panel mat is then pressed for further water removal and mat consolidation. The calcined gypsum of the panel mat is then rehydrated with residual mat moisture to form a board comprising bonded host particles and gypsum with the mesh embedded in the board. Then the board is dried to provide a finished board with the mesh embedded in the board. The process allows a substantial density range of from 320 to 1120 kg/m$^3$, which combined with the large possible thickness range of about 6 to 31 mm, gives a variety of potential product sizes.

Embedding a reinforcing mesh in the gypsum/fiber board, in accordance with the present invention, provides many advantages including high production rates, better product aesthetics, integral consolidation of reinforcing mesh in board, and reduced product cost. Embedding a reinforcing mesh also improves the handling properties of the board. The scrim (also known as mesh) is fully embedded into the board: a scrim merely on the surface is easily damaged and torn loose.

The product of the present invention can include a flush mesh which does not mark up the face of the adjacent panel on which it is stacked, and improved retention of the reinforcement in the panels as it is protected from wearing and rubbing on the surface. Another product benefit is the tensioning of the mesh in the product to provide enhanced stiffness to the panel.

These and other features and advantages of the invention will be apparent to those skilled in the art following the more detailed discussion of the invention which follows with reference to the accompanying drawings, which form part of this specification.

BRIEF DESCRIPTION OF THE DRAWINGS

The accompanying drawings, which are incorporated in and constitute a part of the specification, illustrate several embodiments of the invention and together with the description, serve to explain the operation of the present invention.

DETAILED DESCRIPTION OF THE PRESENT INVENTION

Figure 1A:
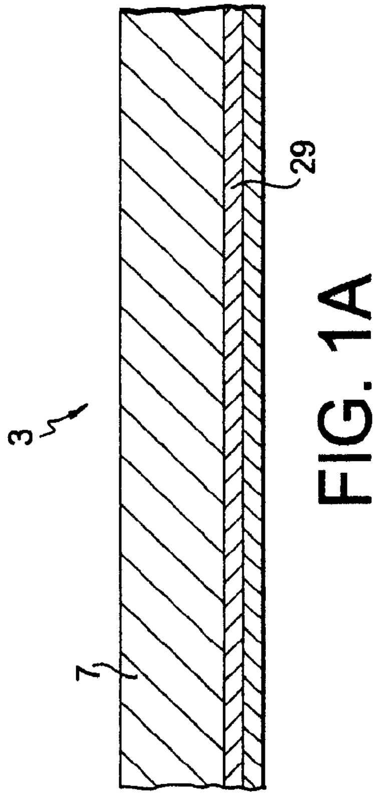
FIG. 1A is a sectional end view of another homogeneous, one-layer board made according to the present invention.

The present invention relates generally to a paperless gypsum/fiber board with improved impact resistance, and to a process for making such a gypsum/fiber board. The paperless gypsum/fiber board having improved impact resistance is produced by embedding a reinforcing mesh, preferably a flexible fiberglass mesh, in the backside of a gypsum fiber board. In the process, the mesh is fed into the forming area of the panel before the panel is pressed and dried.

The Mesh

Enhanced and improved impact resistance of the gypsum/fiber board is provided by embedding a reinforcing mesh in the backside of the gypsum/fiber board. The mesh may be either woven or non-woven and may be made of a variety of materials, for example, fiberglass, polyester, or polypropylene. Preferably the mesh is made from a flat yarn of a low elasticity material such as fiberglass mesh. Most preferably the mesh is a fiber glass mesh having openings in the mesh of sufficient size to allow a quantity of the gypsum/fiber slurry to pass through the mesh and embed the mesh in set gypsum in the final product.

The following meshes are typical meshes which are usable with the present invention. Also, meshes having from 2 per inch to roughly 10 per inch opening are usable with the present invention.

One useful woven fiberglass mesh is available from Bayex under the number 0040/286. BAYEX 0040/286 is a Leno weave mesh having a warp and weft of 6 per inch (ASTM D-3775), a weight of 4.5 ounces per square yard (ASTM D-3776), a thickness of 0.016 inches (ASTM D-1777) and a minimum tensile of 150 and 200 pounds per inch in the warp and weft, respectively (ASTM D-5035). It is alkali resistant and has a firm hand. Other fiberglass meshes having approximately the same dimensions have opening of sufficient size to allow a portion of the gypsum/fiber mix to pass through the mesh during formation of the board and may be used.

Another useful woven fiberglass mesh is available from Bayex under the number 0038/503. BAYEX 0038/503 is a Leno weave mesh having a warp of 6 per inch and weft of 5 per inch (ASTM D-3775), a weight of 4.2 ounces per square yard (ASTM D-3776), a thickness of 0.016 inches (ASTM D-1777) and a minimum tensile of 150 and 165 pounds per inch in the warp and weft, respectively (ASTM D-5035). It is alkali resistant and has a firm hand.

Yet another useful woven fiberglass mesh is available from BAYEX under the number 0038/504. BAYEX 0038/504 is a Leno weave mesh having a warp of 6 per inch and weft of 5 per inch (ASTM D-3775), a weight of 4.2 ounces per square yard (ASTM D-3776), a thickness of 0.016 inches (ASTM D-1777) and a minimum tensile of 150 and 165 pounds per inch in the warp and weft, respectively (ASTM D-5035). It is alkali resistant and has a firm hand. Other fiberglass meshes having approximately the same dimensions have opening of sufficient size to allow a portion of the gypsum/fiber slurry to pass through the mesh during formation of the board and may be used.

Yet another useful woven fiberglass mesh is available from BAYEX under the number 4447/252. BAYEX 4447/252 is a Leno weave mesh having a warp of 2.6 per inch and weft of 2.6 per inch (ASTM D-3775), a weight of 4.6 ounces per square yard (ASTM D-3776), a thickness of 0.026 inches (ASTM D-1777) and a minimum tensile of 150 and 174 pounds per inch in the warp and weft, respectively (ASTM D-5035). It is alkali resistant and has a firm hand. Other fiberglass meshes having approximately the same dimensions have opening of sufficient size to allow a portion of the gypsum/fiber mix to pass through the mesh during formation of the board and may be used.

The mesh is preferably embedded in the backside of the board with the warp oriented in the longitudinal direction of the board. Because the board of the present invention may expand multi-directionally during the setting step, the use of a mesh which is extensible may provide better bonding to the gypsum/fiber board. During the first pressing step, the compression and consolidation should match the rate of water removal and volume decrease caused by the vacuum pressing to produce the proper pore area in the panel. In the second pressing step after the mat springback after the first pressing, the pore space should be removed without disrupting the formation laid down in the forming step. In either case the forming step is important and any later disruption by pressing and mat dislocation will lower the strength and quality of the finished panel.

It is preferred to have the mesh substantially embedded in the board and covered by the gypsum/fiber mix, because this secures the mesh to the board. Additionally, completely embedding the mesh in the gypsum/fiber mix provides the best impact resistance to the board. Completely embedding the mesh in the gypsum/fiber mix also makes the reinforcement less perceptible to the consumer and improves overall surface properties.

Adhesives

If desired, coatings can be used on the scrim to improve wettability, bonding, etc. such as polyvinyl alcohol and polyvinyl acetate related compounds as well as other wetting agents commonly known to those skilled in the art.

The Gypsum/Fiber Board Composition

The materials used to produce the gypsum fiber board are conventional materials. The term "gypsum", as used herein, means calcium sulfate in the stable dihydrate state; i.e. $CaSO_4.2H_2O$, and includes the naturally occurring mineral, the synthetically derived equivalents, such as FGD gypsum (a synthetic gypsum which is the by-product of flue gas desulphurization), and the dihydrate material formed by the hydration of calcium sulfate hemihydrate (stucco) or anhydrite. The term "calcium sulfate material", as used herein, means calcium sulfate in any of its forms, namely calcium sulfate anhydrite, calcium sulfate hemihydrate, calcium sulfate dihydrate and mixtures thereof.

The host particles are typically organic fibers that serve to reinforce the gypsum, and are preferably lignocellulosic fibers that are readily available. For example the cellulosic fiber may be recycled waste products such as box board or cardboard trim, waste paper, used newspaper, and reject fibers of pulp production.

Additional components of the type conventionally used in gypsum fiberboard may be used in the board of the present invention. Such conventional components include accelerators, water resistance agents, fungicides and the like.

Gypsum Fiber Board Structure

Figure 1:
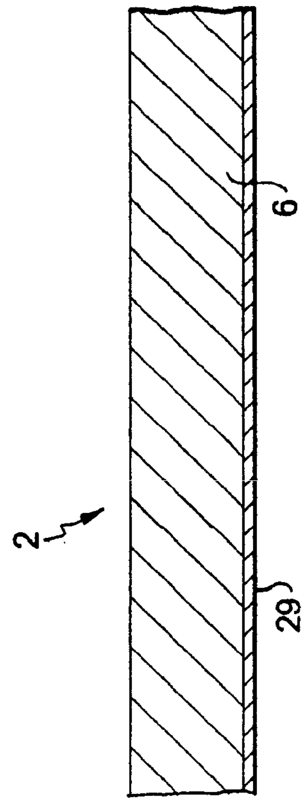
FIG. 1 is a sectional end view of a homogeneous, one-layer board made according to the present invention.

The present invention contemplates the formation of fiber-reinforced gypsum panel having a homogeneous structure throughout, as illustrated by board 2 in FIG. 1 and board 3 in FIG. 1A.

In board 2 having a homogeneous structure, reinforcing mesh 29 is embedded in the back surface of the gypsum/fiber matrix 6 of the board as shown in FIG. 1. If desired the mesh 29 may be spaced in a controlled manner between the front and back surfaces of the gypsum/fiber matrix 7 of the board as shown in FIG. 1A.

Method and Apparatus for Forming the Board

One particularly suitable application of the composite gypsum/wood-fiber material discussed above is for the production of the composite wallboard 2, 3. A process for making the composite wallboard is illustrated schematically in FIG. 2.

A. Upstream Processing

The process begins with a mixing of uncalcined gypsum 10, host particles (typically cellulosic fibers, e.g., wood fibers) 14 and water 12 in a mixer 16 to form a dilute aqueous feed slurry 18. The source of the gypsum 10 may be raw ore or the by-product of a flue-gas-desulphurization or other calcium sulfate generating processes. The gypsum 10 may be of a relatively high purity, i.e., preferably at least about 92-96%, and finely ground, for example, to 92-96% minus 100 mesh or smaller. Larger particles may lengthen the conversion time. The gypsum 10 can be introduced to the reactor feed mixer 16 either as a dry powder or via an aqueous slurry.

The term "host particle" is meant to cover any macroscopic particle, such as a fiber, a chip or a flake, of a substance other than gypsum. The particle, which is generally insoluble in the slurry liquid, should also have accessible voids therein; whether pits, cracks, fissures, hollow cores, or other surface imperfections, which are penetrable by the slurry menstruum and within which calcium sulfate crystals can form. It is also desirable that such voids are present over an appreciable portion of the particle; it being apparent that the more and better distributed the voids, the greater and more geometrically stable will be the physical bonding between the gypsum and host particle. The substance of the host particle should have desirable properties lacking in the gypsum, and, preferably, at least higher tensile and flexural strength. A lignocellulosic fiber, particularly a wood fiber, is an example of a host particle especially well suited for the composite material and process of the invention. According to a preferred embodiment of the invention, the host particle is a paper fiber. However, without intending to limit the material and/or particles that qualify as a "host particle", wood or cellulose fiber(s) are often used hereafter for convenience in place of the broader term.

The source of the cellulosic fiber 14 may be waste paper, wood pulp, wood flakes, and/or another plant fiber or synthetic source. It is preferable that the fiber be one that is porous, hollow, split and/or rough surfaced such that its physical geometry provides accessible interstices or voids which accommodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum; such as hemicelluloses, acetic acid, etc.

The ground gypsum-containing solids and cellulosic (e.g., wood) fibers are mixed together to form a mixture having about 0.5 to 30% by weight cellulosic fibers, preferably 5 to 15 weight % cellulosic fibers or 10 to 15 weight % cellulosic fibers. For example, the gypsum-containing solids and wood fibers are mixed in respective weight proportions of about 85 to 15.

Sufficient water is added to make the feed slurry 18 have at most about 30% or 40% by weight solids (at least about 60% or 70% by weight liquid). For example, sufficient water is added to make the feed slurry 18 have about 5-30% by weight solids (70-95% by weight liquid) or more preferably 10-15% by weight solids (85-90% by weight liquid).

The feed slurry 18 is fed into a reactor system 20. A typical reactor system 20 includes a pressure vessel equipped with a continuous stirring or mixing device. Crystal modifiers 22 can be added to the slurry at this point, if desired, to modify crystallization or to lower the calcining temperature. Slurry is continuously pumped into the reactor 20 with the direct injection of steam to bring the slurry temperature of the vessel to between about 240° F. (116° C.) and about 310° F. (154° C.), and autogeneous pressure. The lower temperature being approximately the practical minimum at which the calcium sulfate dihydrate will calcine to the hemihydrate state (typically calcium sulfate alpha hemihydrate) within a reasonable time. The higher temperature being about the maximum temperature for calcining hemihydrate without undue risk of decomposition of the lignocellulosic components. The slurry temperature is preferably about 285° F. (140° C.) to 305° F. (152° C.).

In the reactor 20, the slurry 18 is preferably continuously mixed or stirred to maintain suspension of fibers and to keep fresh solute in contact with the growing crystals as the conversion is taking place.

When the slurry 18 is processed under these conditions for a sufficient period of time, for example about 15 minutes, the calcium sulfate dihydrate will convert to the hemihydrate molecule. (The dihydrate goes into solution and the hemihydrate form precipitates and recrystallizes to a well formed crystal differing from the original starting hemihydrate.) The solution, aided by the continuous agitation to keep the particles in suspension, will wet out and penetrate the open voids in the host fibers. As saturation of the solution is reached, the hemihydrate will nucleate and begin forming crystals in, on and around the voids and along the walls of the host fibers.

In the reactor 20, it is believed the dissolved calcium sulfate penetrates into the voids in the wood fibers and subsequently precipitates as acicular hemihydrate crystals within, on and about the voids and surfaces of the wood-fibers. Optional process modifying or property enhancing additives (not shown), such as accelerators, retarders, weight reducing fillers, etc. may be added to the product slurry, typically after it is discharged from the reactor 20 and before it is dewatered.

The continuous stream 23 of alpha hemihydrate calcium sulfate and host fibers exits the reactor system 20. The product slurry 23 then feeds a headbox 26. Optionally, the slurry from the reactor 20 feeds a slurry holding tank (not shown) prior to feeding the headbox 26. The slurry discharges from the headbox 26 as a full width slurry stream 28 which feeds onto a continuous felting/dewatering conveyor 44 having flat porous forming fabric (FIG. 3), such as the type used in paper making operations (for example, a fourdrinier forming wire). In particular, the headbox 26 feeds slurry stream 28 into a forming pond 45 on the conveyor 44.

The headbox 26 generally comprises a housing 25 and two horizontal, counter rotating, perforated distribution rolls 26A, 26B that extend substantially across the width of the conveyor 44. The distribution rolls 26A, 26B rotate in opposite directions as shown by arrows in FIG. 4. The housing 25 of the headbox 26 includes a first curved section 26E shaped to match the curvature of the cylindrical surface of the first horizontal, perforated distribution roll 26A. The housing 25 also includes a second curved section 26F shaped to match the curvature of the cylindrical surface of the second horizontal, perforated distribution roll 26B. The two curved sections 26E, 26F extend across the width of the headbox 26.

A weir 26C is formed by the intersection of the curved sections 26E, 26F, and separates first horizontal, perforated distribution roll 26A from second horizontal, perforated distribution roll 26B. A sluice 26D is provided at the downstream end of the second curved section 26F. Sluice 26D extends vertically downwards from second curved section 26F and extends across the width of the conveyor 44.

The second curved section 26F is closer to the conveyor 44 than the first curved section 26E. The headbox 26 has an upstream leading edge underneath the portion of the second curved section 26F closest to the conveyor 44 and has a downstream lip 25A underneath sluice 26D. The upstream lip of the headbox 26 is the portion 25B of the second curved section 26F closest to the conveyor 44 and is spaced from the downstream lip 25A by a distance "L1". A downstream portion of the headbox 26 extends from portion 25B to the end of the headbox 26.

A description of a typical headbox 26 is provided by U.S. Pat. No. 6,605,186 to Miller incorporated herein by reference in its entirety.

B. Mat Forming

Figure 2:
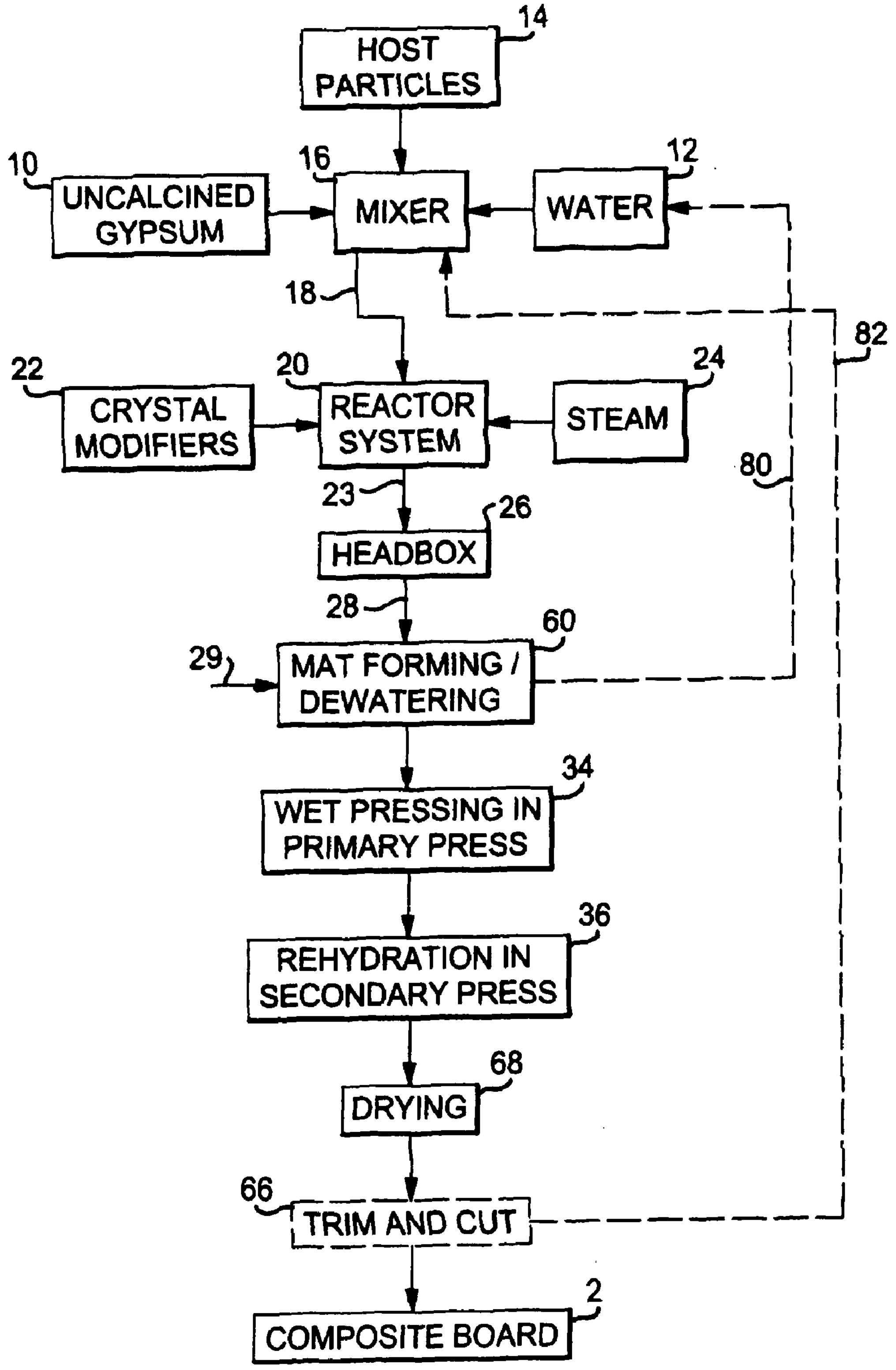
FIG. 2 is a schematic block flow diagram of a process for forming a composite material according to the present invention.

The slurry 28 exits the headbox 26 by running over the sluice 26D and into the forming pond 45. The headbox 26 uniformly disperses the calcined slurry 28, having at least about 70% liquid by weight, across the width of the forming table or conveyor 44 (FIG. 3), where vacuum boxes 32 are used to dewater the slurry into a mat of generally 28-41% moisture content (wet basis) (40-70% moisture content on a dry basis) to perform mat forming/dewatering step 60 (FIG. 2).

Also, as part of the mat forming/dewatering step 60, as the headbox 26 feeds slurry 28 to the forming pond 45 on the conveyor 44, a layer of mesh 29, e.g., fiberglass scrim, unrolls from a feed roll 31 and passes onto an infeeding sheet (or plate) 47, under the headbox 26 and over a rod 38 (FIGS. 4 and 6) into the forming pond 45. The direction of travel "T" of the mesh 29 is shown as an arrow in FIG. 4. The rod 38 (FIGS. 4 and 6) is attached to the infeeding sheet (or plate) 47.

The layer of mesh 29, fed over the infeeding sheet (or plate) 47 under the headbox 26, is held at an elevation downstream of the headbox 26 by the rod 38 and infeeding sheet 47. Typically, the rod 38 and sheet (or plate) 47 are made of metal (for example steel or aluminum), polymer or a durable composite.

Figure 3:
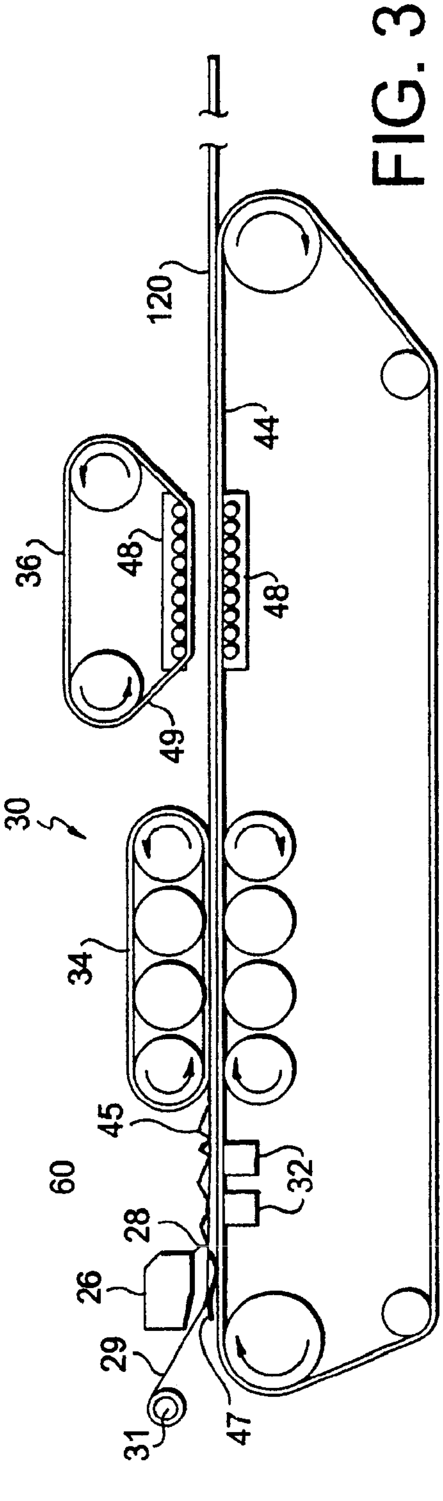
FIG. 3 is a schematic side view illustrating a production line, employing the present invention, for forming gypsum fiberboard having a head box, dewatering vacuum, a dewatering primary press, and infeed assembly for feeding mesh into slurry, arranged for processing a rehydratable gypsum fiber slurry upon a conveyor.
Figure 4:
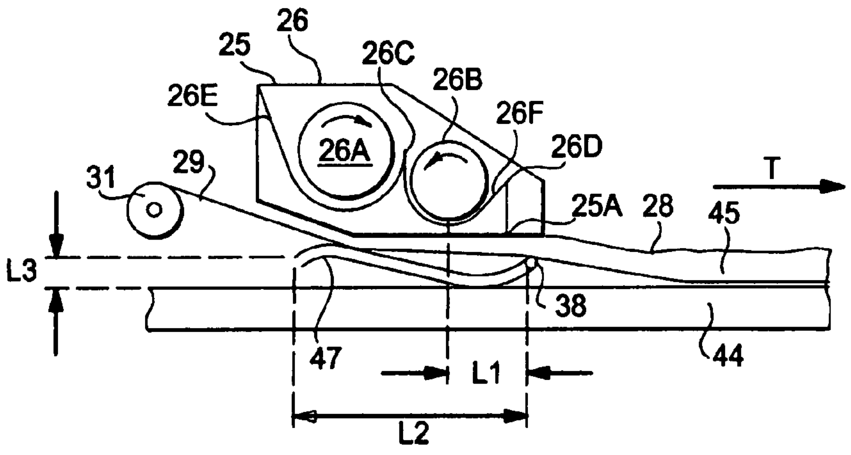
FIG. 4 shows an enlarged side view of a portion of the production line of FIG. 3 showing the infeeding sheet extends under the headbox and around the longitudinal element, e.g., rod, wherein process flow is from left to right for both the forming wire and the scrim (mesh) which is fed over the sheet under the headbox and exits as the slurry is falling from the headbox onto the area where the longitudinal element, e.g. rod is located.

FIG. 4 shows an enlarged view of a portion of the production line of FIG. 3 showing the metal infeeding sheet 47 extending under the headbox 26 and around the rod 38. Process flow is from left to right for both the forming wire (conveyor 44) and the scrim (mesh) 29 which is fed over the sheet 47 under the headbox 26 and exits as the slurry is falling from the headbox 26 onto the area where the downstream end of the sheet 47 with rod 38 is located.

As seen in FIG. 4, the rod 38 and infeeding sheet (or plate) 47 are submerged in the slurry 28 of the forming pond 45. This quickly embeds the mesh 29 to minimize disruption of formation of a mat panel.

The downstream end of the infeeding sheet 47 includes the rod 38 and is located below, slightly upstream of, or slightly downstream of, headbox downstream lip 25A. For example, the downstream end of the sheet 47 containing the rod 38 could be in a range of 0 to 4 inches (or other suitable distance) upstream or downstream of the headbox downstream lip 25A. The presence of the sheet 47 assists in preventing slurry backflow under the header when the downstream end of the sheet 47 is downstream of the lip 25A. If desired, the downstream end of the sheet 47 may be moved upstream to below the downstream half (distance "L1") of the second curved section 26F.

Typically, the sheet 47 has an inverted S-shaped bend. The lowest elevation of the inverted S-shaped bend is where the bottom of the sheet contacts the forming wire 44 under the headbox 26. The highest elevation of the sheet 47 is at the infeed of the scrim upstream of the headbox. The downstream end of the sheet 47 has an intermediate elevation. Typically, the S-shaped curve of the metal sheet 47, has its lowest point about ⅛ to ½, typically about ¼, of the length "L2" of the infeeding sheet 47 before the downstream end of the sheet at rod 38 (FIG. 4).

The sheet 47 typically has an upwards bend from the lowest point towards its downstream end. The angle of the upwards bend is somewhat dependent on the elevation of the headbox above the forming wire, the tension on the fiberglass scrim web, and the line speed. Typically, the bend starts 6 to 18 inches from the downstream end of the sheet 47 and has a slope forming an angle "A" (FIG. 5A) of at most about 20 degrees from a horizontal axis.

Sheet 47 has two nips. One is the nip of the sheet 47 with the headbox lip 25A, or other portion of the second cylindrical section 26B, above it and the mesh 29 passing between. The second nip is the nip of the sheet 47 with the conveyor 44 underneath it and the forming wire passing between. The furthest upstream edge of sheet 47 should be spaced above the incoming forming fabric a distance "L3", for example 0.5 to 3 inches, to be far enough above the incoming forming fabric that no contact is made that might damage the forming fabric or catch on a fabric seam or edge seal.

Although FIG. 4 shows the headbox 26 separated by a substantial distance from the conveyor 44, in actuality the nip (downstream portion) of the sheet 47, the scrim 29 and the headbox downstream lip 25A form a seal to keep a substantial amount of slurry from leaking under the headbox 26 and behind the downstream lip 25A. Slurry building up upstream of the downstream lip 25A and upstream of the sheet 47 downstream end distorts the lip 25A causing irregular formation.

Without the sheet 47 (for example see FIG. 6A), if the rod 38 is close enough to the upstream side of the lip 25A and close enough to the moving forming fabric underneath it, satisfactory board may be made if tolerances and control of equipment can be maintained.

The tension on the mesh 29 allows the mesh 29 to be embedded at a controlled depth. With little tension, vacuum force applied by vacuum boxes 32 during dewatering (step 60 on FIG. 2) moves the mesh 29 to the bottom of the forming pond 45 and of the resulting board. Vacuum is applied to vacuum boxes 32 from a vacuum generating device such as a vacuum pump, most preferably a liquid ring pump.

With more tension on the mesh 29, the mesh 29 is embedded further away from the bottom of the mat 46 which eventually forms the panel 120. The bend in the sheet or plate 47 causes the device to be self-cleaning and eliminates the problems associated with use of the rod 38 alone.

Figure 5:
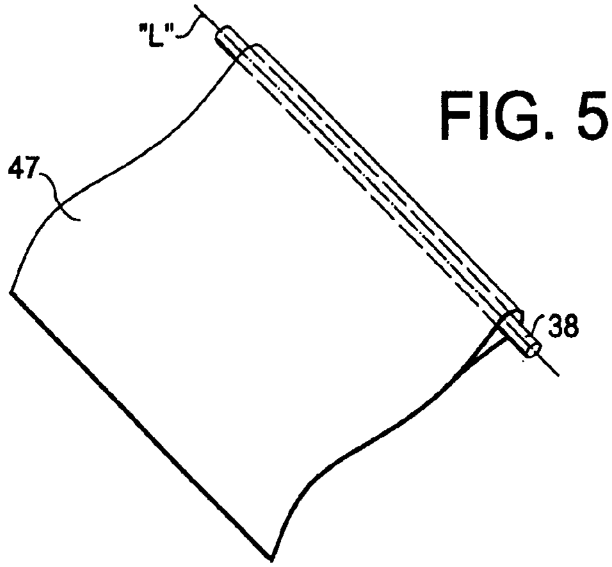
FIG. 5 shows a perspective view of the longitudinal element, e.g., rod having a longitudinal axis "L" and the infeeding sheet attached to the rod.
Figure 5A:
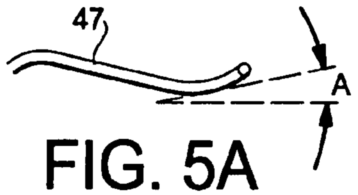
FIG. 5A shows a side view of the infeeding sheet attached to the rod.

FIG. 5 shows a perspective view of the rod 38 having a longitudinal axis "L" and the infeeding sheet 47. As seen in FIG. 5 one end of the sheet 47 is attached to the rod 38 by being wrapped around the rod 38. However, the rod 38 and sheet 47 could be attached in other ways or be a single integral piece if desired.

Figure 6:
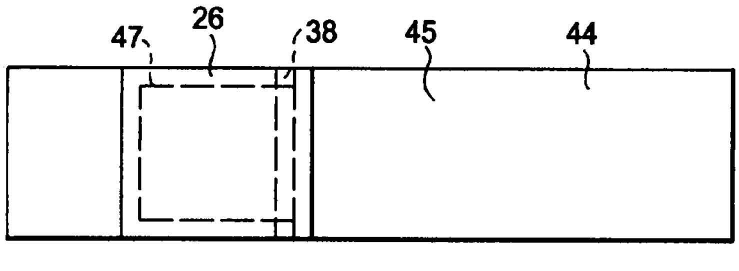
FIG. 6 shows a schematic top view of the upstream end of the forming pond which includes the rod and sheet, the sheet extends under the headbox and is upstream of the rod.

FIG. 6 shows a schematic top view of the upstream end of the conveyor 44 and shows the forming pond 45, the rod 38 and the infeeding sheet 47, the sheet 47 extends under the headbox 26 and is upstream of the rod 38. Process flow is from left to right.

Figure 6A:
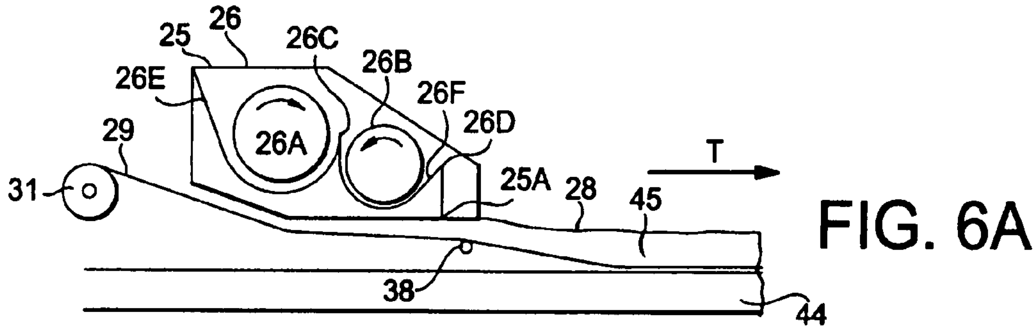
FIG. 6A shows a second embodiment in which an infeeding sheet is replaced by a rod downstream of a headbox.

FIG. 6A shows a second embodiment in which the infeeding sheet is replaced by an elevating rod 38 at or about the downstream end of a headbox 26.

Figure 7:
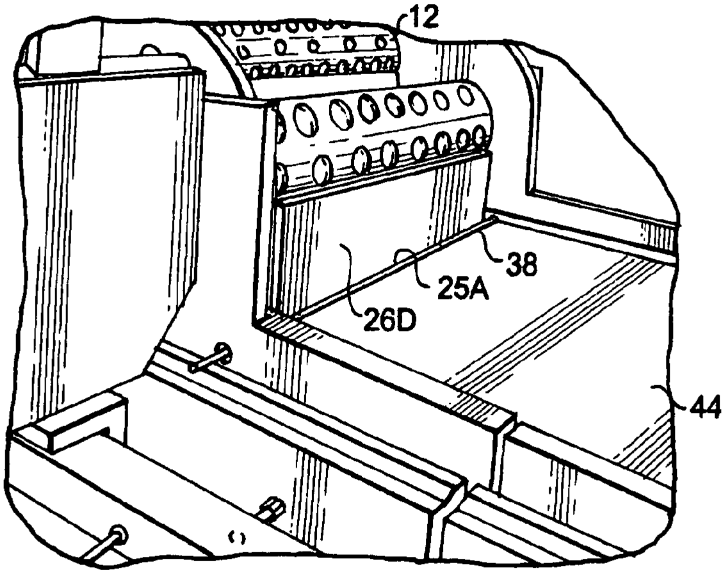
FIG. 7 is a photograph of an embodiment of the present invention showing the downstream side of the headbox, a portion of the conveyor, and the rod just downstream of the headbox without the infeeding sheet to more fully show the rod.

FIG. 7 is a photograph of an embodiment of the present invention showing the downstream side of the headbox 26, a portion of the conveyor 44, and the rod 38 just downstream of the headbox without the infeeding sheet.

Figure 8:
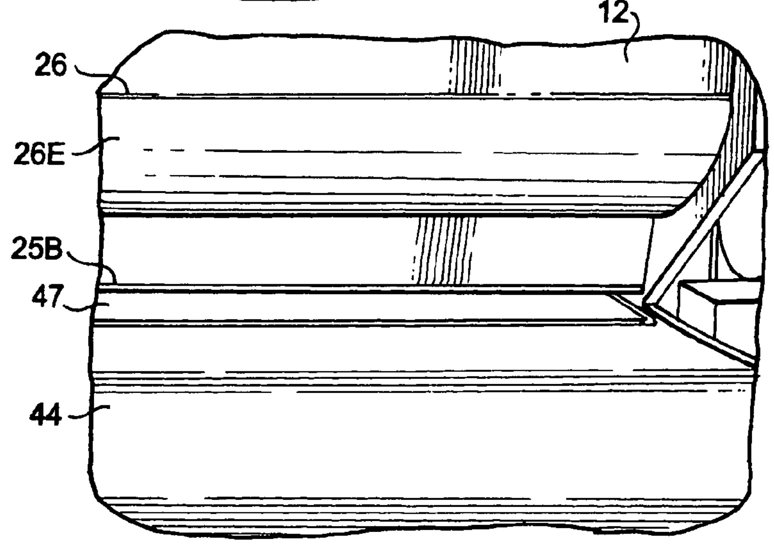
FIG. 8 is a photograph of the embodiment of FIG. 7 showing the upstream side of the headbox, a portion of the conveyor, and the upstream end of the sheet metal mounted to extend upstream of the mesh inlet side of the headbox to define an inlet side for feeding scrim under the headbox and an inlet opening between the sheet metal and the headbox lip.

FIG. 8 is a photograph of the embodiment employing an infeeding sheet and rod (not shown). FIG. 8 shows the upstream bottom side of the headbox 26, a portion of the conveyor 44, and the upstream end of the infeeding sheet 47 mounted to extend upstream of the headbox lip upstream 25B to define an inlet side for feeding scrim under the headbox 26. In this photograph, the upstream half of the S curve of the infeeding sheet 47 is missing, Thus, one can see how the forming wire seam and/or edge seal might catch if the upstream half of the S curve of the infeeding sheet 47 is not provided.

The bottom of the upstream part of the infeeding sheet 47 is in contact with the top of the forming wire of the conveyor 44 under the headbox 26. The infeeding sheet is the lighter colored member resting on the black forming wire of the conveyor 44.

Figure 9:
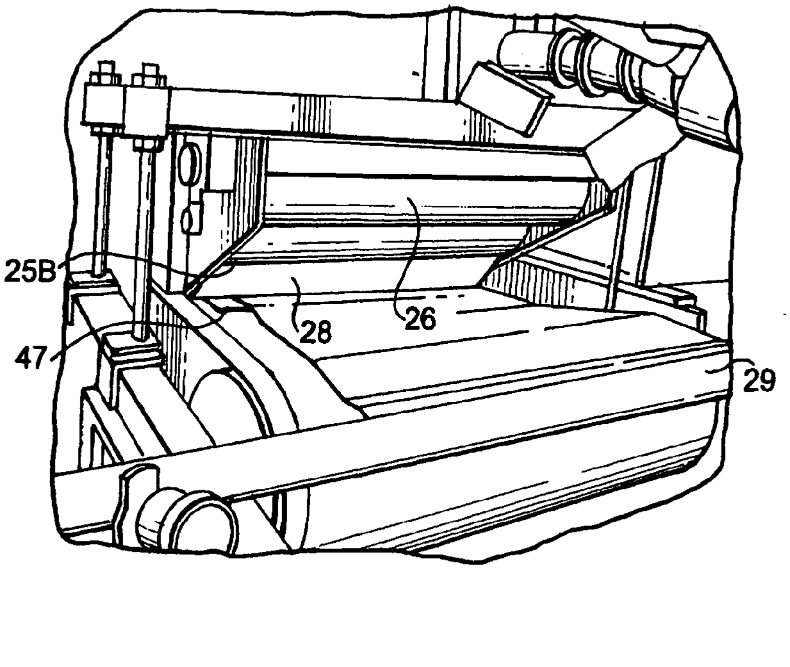
FIG. 9 is a photograph showing feeding the scrim between the infeeding sheet and a lip of the headbox. In this photograph process flow is from right to left. As the scrim feeds under the headbox, the scrim keeps the sheet metal clean in the forming pond.

FIG. 9 is a photograph showing feeding the scrim 29 between the infeeding sheet 47 and the back lip of the headbox 26. The very edge of the infeeding sheet 47 is seen sticking out from the left side underneath the scrim 29 and at an elevation above the forming wire to prevent snagging. As the scrim 29 feeds under the headbox 26, the scrim 29 keeps the infeeding sheet 47 clean in the forming pond 45 and does not adversely affect formation. The top side of the scrim 29 is in contact with the bottom of the headbox upstream lip 25B during startup and the bottom of the scrim 29 is in contact with the infeeding sheet 47 upper surface. In this photograph process flow is from right to left. Some slurry 28 has leaked under the upstream lip 25B due to the hydraulic head of the forming pond 45 and typically forms a seal against further leakage.

Figure 10:
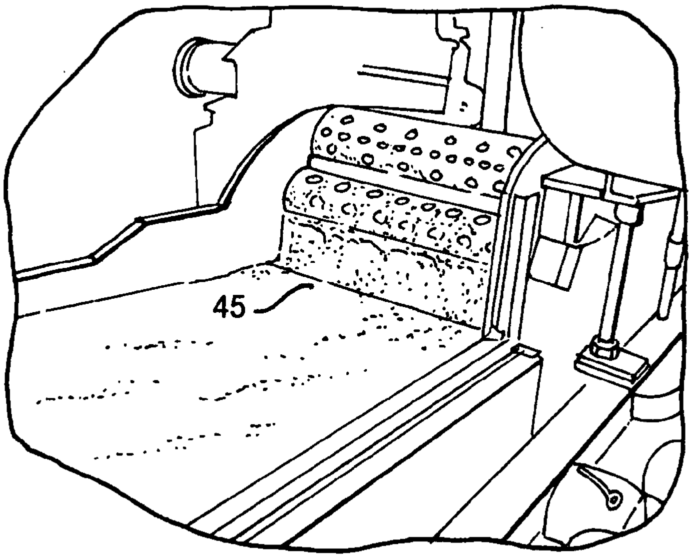
FIG. 10 shows a first view of a forming pond (slurry pond) filled with slurry.

FIG. 10 shows a first view of a forming pond 45 filled with slurry.

Figure 11:
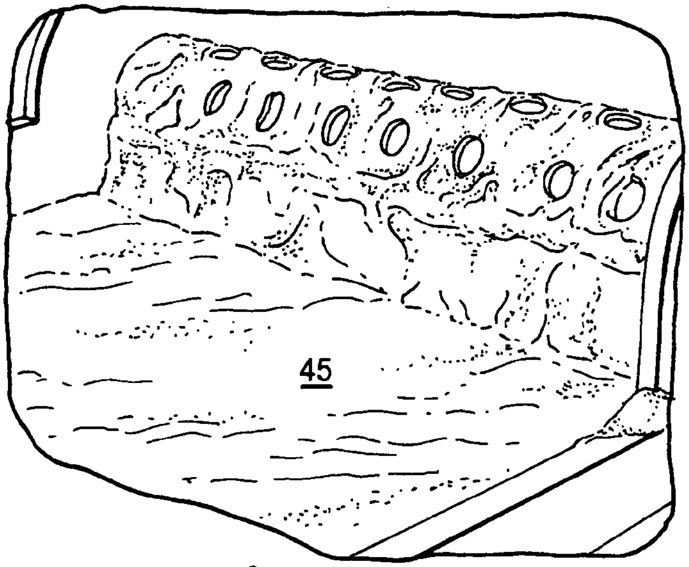
FIG. 11 shows an enlarged view of a portion of the forming pond filled with slurry and that the scrim and sheet metal/rod assembly does not adversely affect formation.

FIG. 11 shows a enlarged view of a portion of the forming pond 45 filled with slurry without disruption of the slurry due to the sheet/rod device.

In both FIGS. 10 and 11, the downstream end (wet line) of the forming pond 45 is where the darker colored pond becomes lighter colored. It is lighter colored because the water has been stripped from the surface of the pond.

Figure 12:
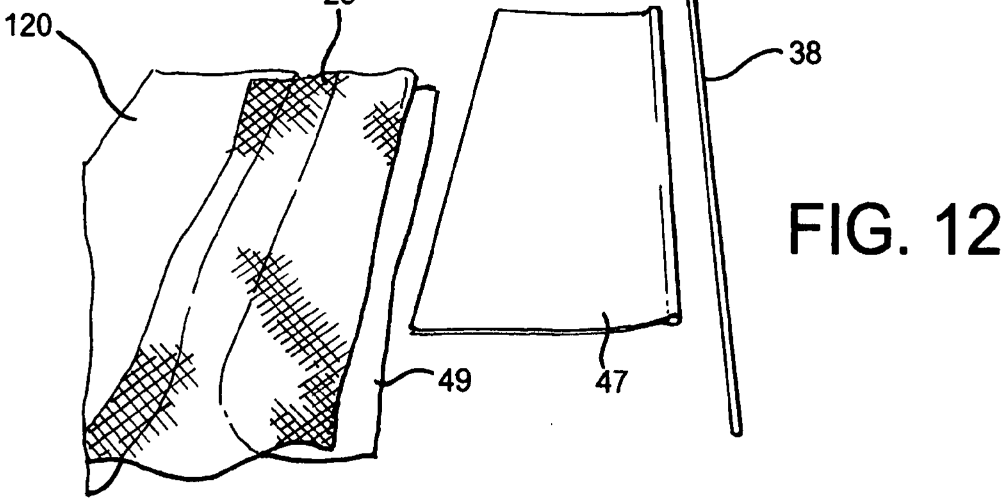
FIG. 12 is a photograph showing an example of a piece of rod, sheet metal, and fiberglass mesh scrim attached to a piece of cardboard at one end and formed into a piece of composite panel at the other end. The cardboard taped to the scrim assists to initially feed the scrim when the machine is started.

FIG. 12 is a photograph showing an example of a piece of rod 38, infeeding sheet 47, and fiberglass mesh scrim 29 attached to a piece of cardboard 49 at one end and formed into a piece of panel at the other end. The cardboard 49 taped to the scrim 29 facilitates initially feeding the scrim 29 when the conveyor is started. The vertical force of the cardboard 49 on the forming wire of the conveyor 44 due to the vacuum from vacuum boxes 32 keeps the scrim 29 moving at the same speed as the forming wire until the forming wire is covered with slurry. The vacuum then applies its vertical force to the forming wire covered with slurry to maintain the same line speed between the mesh and the wire.

C. Pressing and Rehydration

As shown in FIG. 3 of the forming line apparatus 30, downstream of the vacuum boxes 32, the wet (primary) press 34, which has alternating nips of suction and plain rolls, and a porous fabric, further dewaters and consolidates the mat under the combined effect of vacuum and pressure to a moisture content (wet basis) of 23-35% (30-55% on a dry basis) to produce a mat 120. The wet (primary) press 34: 1) removes about 80-90% of remaining water; and 2) decreases slurry volume by the water removal to nip the filter cake mat to a desired thickness. If desired, a water recycle stream 80 (FIG. 2) may be provided to recycle water removed by either the vacuum boxes 32 and/or the wet (primary) press 34 to the feed water 12. The spacing between the first presses 34 and secondary presses 36—whether measured by time or distance—is related to the hydration the calcium sulfate hemihydrate. An example of a hydration curve is shown in U.S. Pat. No. 6,197,235 to Miller et al. incorporated herein by reference. Only slight hydration (less than 10%) occurs in the primary press 34.

After the primary press 34 the mat feeds a secondary press 36 used for medium to higher density products. The secondary press 36 1) imparts a surface texture or smoothness that is the negative image of the surface of the belt used, 2) achieves a final calibrated board thickness as the setting composite expands against the press belt or die, and 3) aids in improving flexural strength as the crystallizing composite expands during rehydration against the press belt, thereby densifying the panel surfaces.

This secondary press 36 decreases thickness variation through a fixed-gap nip setting slightly less than the desired end result board thickness and slightly greater than the closest gap in the primary press 34. The gypsum expansion against such a fixed-gap surface also improves ultimate bending strength.

The majority of the rehydration of the alpha hemihydrate to the dihydrate occurs in the secondary press 36.

Expansion of the crystal formation with the fibrous particles gripped therein forces the setting mat against the belt 49 of the secondary press 36 as the rehydration rate increases to reach a relative temperature level, being a certain percentage of the difference between the starting rehydration temperature and the highest temperature achieved during rehydration, at which point the mat exits the press 48.

Depending on the accelerators, retarders, crystal modifiers, or other additives provided in the slurry, hydration may take from only a few minutes to an hour or more. Because of the interlocking of the acicular hemihydrate crystals with the wood-fibers, and the removal of most of the carrier liquid from the filter cake, migration of the calcium sulfate particles is averted, leaving a homogeneous composite. The rehydration produces a recrystallization of the hemihydrate to dihydrate in place within and about the voids and on and about the wood fibers, thereby preserving the homogeneity of the composite. The crystal growth also connects the calcium sulfate crystals on adjacent fibers to form an overall crystalline matrix, enhanced in strength by the reinforcement of the wood fibers.

When finally set, the unique composite material exhibits desired properties contributed by both of its two major components. The wood fibers increase the ductile strength, particularly flexural strength, of the gypsum matrix, while the gypsum acts as a coating and stiffening binder to protect the wood fiber and impart fire resistant.

Also, if desired, a particular surface texture can be imparted to the filter cake in the wet pressing operation to provide a board with a textured finish as taught by U.S. Pat. No. 6,197,235, incorporated herein by reference. A surface laminate or coating could be applied after the wet pressing step and/or after the final drying, which removes excess water to achieve a stable strong finished panel. Drying to remove excess water removes at least some of the free water. After drying, the board still contains the water chemically bound to the gypsum and may still contain some free water. If desired, the products may have a surface coating applied, some before and some after the drying step. At any rate, many additional variations of this aspect of the process will occur readily to those skilled in the art. After the dewatered filter cake is pressed, rehydrated and dried, the resulting board typically has a density between 40-70 pcf.

D. Cutting and Drying

After discharging from secondary press 36 the mat 120 is dried in a drier 68 and then sent to trimming and cutting device 66 to form boards of the desired lengths and widths. If desired, trimming and cutting may occur before and/or after drying. Also, if desired, cut excess pieces of board can be recycled via stream 82 through a scrim removal step to the mixer 16. If edge chipping of the edge trim occurs, the scrim removal step is minimized.

Noncombustible Board

In a preferred embodiment, a fiber-reinforced board is produced that allows the panels to pass the ASTM E119 test procedure.

EXAMPLE

In an example of the present invention, 13.6 lb. of wood fiber (generated from Spruce wood chips using a Bauer 415 rotating double disc refiner) was mixed with 122.4 lb. of gypsum in 771 lb. of water to form a slurry. The slurry was calcined at 295° F. (146° C.) for 15 minutes with a continuous reactor system. Resulting hemihydrate slurry was fed continuously to a headbox concurrently with continuous fiberglass scrim fed under the headbox over a piece of sheet metal in an S shape with the downstream edge of the sheet metal tightly bound around a ⅜ inch diameter (0.95 cm) length of threaded rod that was mounted at its ends in the side deckles downstream of a 26 inch (66 cm) wide headbox.

Slurry was dewatered with table vacuum at 10" Hg (24.4 cm Hg) vacuum prior to entering a primary press with vacuum rolls set at daylight gap settings of 0.440 inches (1.12 cm). Primary press vacuum was as high as 18 inches Hg (46 cm Hg). A continuous forming wire under the headbox and slurry and primary press transported the mat into a continuous press with a solid rubber-faced top belt, maintained at a daylight gap opening of 0.480 inches (1.22 cm). Mat entering the secondary press was soft to thumb pressure and hard to thumb pressure at the press exit, indicating the progression of hydration from the hemihydrate to the dihydrate gypsum form. Continuous mat was cut to 8 feet (2.44 m) long panels with a high pressure water jet.

After further hydration, panels were dried into strong final boards with the fiberglass scrim embedded approximately 1/16 inch (0.16 cm) from the bottom of the back surface of the resulting half inch (1.27 cm) thick panels. Panels could be easily handled from the ends and flexed without catastrophic failure, demonstrating improved handleability due to the fiberglass scrim.

The forms of invention shown and described herein are to be considered only as illustrative. It will be apparent to those skilled in the art that numerous modifications may be made therein without departing from the spirit of the invention and the scope of the appended claims.

I claim:

1. A method of producing a gypsum/fiber board comprising the steps of:

mixing ground gypsum and host particles of a fibrous reinforcing material and sufficient liquid comprising water to make a slurry having fibrous solids and at least 60% liquid by weight;

calcining the gypsum in the presence of the host particles and the water, by heating the slurry under pressure, to form a slurry mixture comprising water and calcium sulfate alpha hemihydrate crystals;

feeding the slurry mixture through a headbox to a panel forming area over the upper surface of a flat porous forming fabric of a moving conveyor;

providing a transverse member over a portion of the forming fabric, wherein a downstream portion of the transverse member is under a downstream portion of the headbox or downstream of the headbox;

passing a layer consisting essentially of reinforcing mesh under the headbox, over the transverse member, and into a forming pond on the forming fabric to embed the reinforcing mesh in the slurry mixture in the forming pond, wherein the transverse member extends transverse to a direction of movement of the mesh, and wherein the transverse member comprises a sheet located over a portion of the forming fabric, the sheet having an upstream portion, a downstream portion, and a middle portion between the upstream portion and the downstream portion, wherein the upstream portion of the sheet is upstream of an upstream lip of the head box, wherein the middle portion of the sheet is under the headbox, wherein the reinforcing mesh passes between the sheet and the headbox and into the forming pond to embed the reinforcing mesh in the slurry mixture in the forming pond, wherein the sheet has transverse bends to form an inverted S-shaped curve, with the lowest elevation of the sheet where a bottom of the sheet contacts the forming fabric under the headbox and the highest elevation of the sheet at the infeed of the mesh upstream of the headbox, and an intermediate elevation of the sheet at the downstream end of the sheet, removing water from the slurry mixture to form a panel mat with the mesh embedded in the panel mat;

pressing the panel mat having the embedded mesh;

rehydrating the calcined gypsum of the pressed panel mat to form a board comprising bonded host particles and gypsum with the mesh embedded in the board; and drying the board to provide a finished board with the mesh embedded in the finished board.

2. The method of claim 1, wherein the transverse member further comprising an elongate member attached to the downstream portion of the sheet, wherein the elongate member has a longitudinal axis transverse to the direction of travel of the mesh.

3. The method of claim 1, wherein the mesh is embedded in a lower surface of the panel mat.

4. The method of claim 1, wherein the mesh is spaced above a forming belt in the panel forming area.

5. The method of claim 1, wherein the downstream end of the sheet forms a bend having an upwards angle of at most about 20 degrees relative to a horizontal plane upon which the middle portion lies.

6. The method of claim 1, wherein the host particles have voids on their surfaces and/or within their bodies penetrable by the slurry menstruum containing suspended and/or dissolved gypsum, the slurry being sufficiently dilute to substantially wet out the penetrable voids in the host particles and to foster the formation of acicular calcium sulfate alpha hemihydrate crystals when heated under pressure;

wherein the slurry is heated in a pressure vessel, with continuous agitation, to a temperature sufficient to calcine the gypsum to calcium sulfate alpha-hemihydrate, and the slurry is maintained at such temperature until at least some calcium sulfate hemihydrate has substantially crystallized in and about the voids in the host particles.

7. The method of claim 1, wherein the pressing is complete when the panel mat is from about 40 to 70% fully rehydrated.

8. The method of claim 1, wherein the host particles are cellulosic particles selected from the group consisting of fibers, chips and flakes.

9. The method as in claim 1, wherein the host particles comprise wood fibers and the solids in the slurry mixture comprise about 0.5-30% by weight said wood fibers.

10. The method as in claim 1, wherein the host particles comprise wood fibers and the solids in the slurry mixture comprise about 5-15% by weight said wood fibers.

11. The method as in claim 1, wherein the slurry mixture comprises at least about 70-95% by weight water.

12. The method as in claim 1, wherein the slurry mixture comprises at least about 85-90% by weight water.

13. The method of claim 1, wherein the mesh is inelastic.

14. The method of claim 1, wherein the mesh is fiberglass.

15. The method of claim 1, wherein the mesh is woven.

16. The method of claim 1, wherein the mesh is a Leno weave woven mesh.

17. The method of claim 1, wherein the mesh is fully embedded in the finished board to not mark up the face of a second board on which the finished board is stacked.

18. The method of claim 1, wherein the transverse member further comprising an elongate member attached to the downstream portion of the sheet, wherein the elongate member has a longitudinal axis transverse to the direction of travel of the mesh.

19. The method of claim 1, wherein the upstream end of the sheet is spaced 0.5 to 3 inches above the incoming forming fabric.

20. The method of claim 19, wherein the upstream end of the sheet forms a bend having an downwards angle relative to a horizontal plane upon which the middle portion lies, wherein the downstream end of the sheet forms a bend having an upwards angle of at most about 20 degrees relative to a horizontal plane upon which the middle portion lies and the mesh is spaced from and above the portion of the sheet of lowest elevation between the portion of sheet of highest elevation and the downstream end of the sheet.

21. The method of claim 1, wherein the sheet has a first nip and a second nip, wherein the first nip is a nip of the sheet with the headbox lip and the second nip is a nip of the sheet with the forming fabric underneath the sheet; and the layer passed under the headbox, over the transverse member, and into the forming pond consists of the reinforcing mesh.

22. The method of claim 1, wherein the downstream end of the sheet is downstream of the lip.

23. An apparatus for producing a gypsum/fiber board comprising:

a mixer for mixing ground gypsum and host particles of a fibrous reinforcing material and sufficient liquid comprising water to make a slurry having at least 60% liquid by weight;

a reactor for calcining the gypsum in the presence of the host particles and the water, by heating the slurry under pressure, to form a slurry mixture comprising water and acicular calcium sulfate alpha hemihydrate crystals;

a headbox for feeding the slurry mixture through the headbox into a forming pond of a panel forming area over the upper surface of a flat porous forming fabric;

a transverse member over a portion of the forming fabric, wherein a downstream portion of the transverse member is under a downstream portion of the headbox or downstream of the headbox;

a space between the headbox and the transverse member for feeding a reinforcing mesh between the transverse member and the headbox and then into the forming pond to embed the reinforcing mesh in the slurry mixture in the forming pond;

vacuum means for removing water from the slurry mixture to form a panel mat with the mesh embedded in the panel mat;

a first press for pressing the panel mat having the embedded mesh;

a second press for permitting rehydrating of the calcined gypsum of the pressed panel mat to form a board comprising bonded host particles and gypsum with the mesh embedded in the board; and a drier for drying the board to remove free water and provide a finished board with the mesh embedded in the finished board; and wherein the transverse member comprises a sheet located over a portion of the forming fabric, the sheet having an upstream portion, a downstream portion, and a middle portion between the upstream portion and the downstream portion, wherein the upstream portion of the sheet is upstream of an upstream lip of the head box, wherein the middle portion of the sheet is under the head-box, wherein the reinforcing mesh passes between the sheet and the headbox and into the forming pond to embed the reinforcing mesh in the slurry mixture in the forming pond, wherein the sheet has transverse bends to form an inverted S-shaped curve, with the lowest elevation of the sheet where a bottom of the sheet contacts the forming fabric under the headbox and the highest elevation of the sheet at the infeed of the mesh upstream of the headbox, and an intermediate elevation of the sheet at the downstream end of the sheet.

24. The apparatus of claim 23, wherein the downstream end of the sheet forms a bend having an upwards angle of at most about 20 degrees relative to a horizontal plane upon which the middle portion lies.

* * * * *